(12) United States Patent  
Satterwhite

(10) Patent No.: US 7,461,965 B2
(45) Date of Patent: Dec. 9, 2008

(54) CAVITATION CHAMBER WITH FLEXIBLY MOUNTED REFLECTOR

(75) Inventor: Richard D. Satterwhite, Grass Valley, CA (US)

(73) Assignee: Impulse Devices, Inc., Grass Valley, CA (US)

( * ) Notice: Subject to any disclaimer, the term of this patent is extended or adjusted under 35 U.S.C. 154(b) by 585 days.

(21) Appl. No.: 11/305,786

(22) Filed: Dec. 16, 2005

(65) Prior Publication Data

US 2007/0138912 A1 Jun. 21, 2007

(51) Int. Cl.
*B01F 11/00* (2006.01)

(52) U.S. Cl. .................. 366/114; 366/127; 422/127; 422/128

(58) Field of Classification Search ............. 366/114, 366/115, 127; 422/127, 128
See application file for complete search history.

(56) References Cited

U.S. PATENT DOCUMENTS

| 2,108,416 | A | * | 2/1938 | Smith et al. | 414/523 |
| 2,667,706 | A | * | 2/1954 | Morse et al. | 34/279 |
| 2,875,989 | A | * | 3/1959 | Toulmin | 366/114 |
| 3,113,761 | A | * | 12/1963 | Platzman | 366/115 |
| 3,516,645 | A | * | 6/1970 | Arndt et al. | 366/115 |
| 4,333,796 | A | | 6/1982 | Flynn | |
| 4,339,247 | A | | 7/1982 | Faulkner et al. | |
| 4,563,341 | A | | 1/1986 | Flynn | |
| 4,991,152 | A | | 2/1991 | Letiche | |
| 5,030,873 | A | | 7/1991 | Owen | |
| 5,658,534 | A | | 8/1997 | Desborough et al. | |
| 5,659,173 | A | | 8/1997 | Putterman et al. | |
| 5,722,444 | A | | 3/1998 | Prokopenko et al. | |
| 5,858,104 | A | | 1/1999 | Clark | |

(Continued)

FOREIGN PATENT DOCUMENTS

WO PCT/US95/15972 7/1996

(Continued)

OTHER PUBLICATIONS

Blake et al, Acoustic Cavitation:The Fluid Dynamics of Non-Spherical Bubbles, Phil. Trans. R. Soc. Lond. A, 1999, pp. 251-267, vol. 357, Publisher: The Royal Society, Published in: Great Britain.

(Continued)

*Primary Examiner*—David L Sorkin
(74) *Attorney, Agent, or Firm*—C. Brandon Browning; Maynard, Cooper & Gale, PC

(57) ABSTRACT

A cavitation chamber separated into two volumes by a gas-tight and liquid-tight seal, the seal formed by the combination of a rigid acoustic reflector and a flexible member, is provided. The rigid reflector improves the cavitation characteristics of the chamber while the flexible member insures that the reflector can move during the cavitation process. One of the two chamber volumes is filled, or at least partially filled, with cavitation fluid while the other chamber volume remains devoid of cavitation fluid during system operation. A conduit couples a region above the liquid free surface in one cavitation volume to the second, unfilled chamber volume, thus preventing the reflector from being subjected to undue pressures. An acoustic driver, such as a ring of piezoelectric material, is coupled to the chamber and used to drive cavitation within the cavitation fluid contained within the chamber.

13 Claims, 7 Drawing Sheets

U.S. PATENT DOCUMENTS

| | | | |
|---|---|---|---|
| 5,968,323 | A | 10/1999 | Pless |
| 5,994,818 | A | 11/1999 | Abramov et al. |
| 5,998,908 | A | 12/1999 | Goodson |
| 6,361,747 | B1 | 3/2002 | Dion et al. |
| 6,617,765 | B1 | 9/2003 | Lagier |
| 6,690,621 | B2 | 2/2004 | Porzio |
| 2002/0090047 | A1 | 7/2002 | Stringham |

FOREIGN PATENT DOCUMENTS

| | | |
|---|---|---|
| WO | WO 01/39200 A2 * | 5/2001 |
| WO | PCT/US02/16761 | 12/2002 |
| WO | PCT/CA03/00342 | 9/2003 |

OTHER PUBLICATIONS

M. Dan et al., Ambient Pressure Effect on Single-Bubble Sonoluminescence, Physical Review Letters, Aug. 30, 1999, pp. 1870-1873, vol. 83, No. 9, Publisher: The American Physical Society, Published in: US.

Moss et al., Computed Optical Emissions from a Sonoluminescing Bubble, Physical Review E, Mar. 1999, pp. 2986-2992, vol. 59, No. 3, Published in: US.

Y.T. Didenko et al., Effect of Noble Gases on Sonoluminescence Temperatures during Multibubble Cavitation, Physical Review Letters, Jan. 24, 2000, pp. 777-780, vol. 84, No. 4, Publisher: The American Physical Society, Published in: US.

Gaitan et al, Experimental Observations of Bubble Response and Light Intensity Near the Threshold for Single Bubble Sonoluminescence, Physical Review E, May 1999, pp. 5495-5502, vol. 59, No. 5, Published in: US.

Barber et al, Sensitivity of Sonoluminescence to Experimental Parameters, Physical Review Letters, Feb. 28, 1994, pp. 1380-1382, vol. 72, No. 9, Published in: US.

F.R. Young, Sonoluminescence from Water Containing Dissolved Gases, J. Acoust. Soc. Am., Jul. 1996, pp. 100-104, vol. 60, No. 1, Publisher: Acoustical Society of America, Published in: US.

Putterman, Sonoluminescence:Sound Into Light, Scientific American, Feb. 1995, pp. 46-51.

Gaitan et al, Sonoluminescence and Bubble Dynamics for a Single, Stable, Cavitation Bubble, J. Acoust. Soc. Am., Jun. 1992, pp. 3166-3183, vol. 91, No. 6, Publisher: Acoustical Society of America, Published in: US.

Crum, Sonoluminescence, Physics Today, Sep. 1994, pp. 22-29, Publisher: American Insitute of Physics, Published in: US.

A. Chakravarty et al., Stable Sonoluminescence Within a Water Hammer Tube, Physical Review E, Jun. 24, 2004, pp. 1-8, vol. 69, No. 066317, Publisher; The American Physical Society, Published in: US.

Bollinger, Ultra Cavitation, http://wiretap.area.com/Gopher/Library/Article/Sci/cavitate.ult, Sep. 17, 2001, pp. 1-26.

* cited by examiner

CAVITATION CHAMBER WITH FLEXIBLY MOUNTED REFLECTOR

FIELD OF THE INVENTION

The present invention relates generally to sonoluminescence and, more particularly, to an apparatus for improving the resonant cavity qualities of a cavitation chamber coupled to an acoustic driver.

BACKGROUND OF THE INVENTION

Sonoluminescence is a well-known phenomena discovered in the 1930's in which light is generated when a liquid is cavitated. Although a variety of techniques for cavitating the liquid are known (e.g., spark discharge, laser pulse, flowing the liquid through a Venturi tube), one of the most common techniques is through the application of high intensity sound waves.

In essence, the cavitation process consists of three stages; bubble formation, growth and subsequent collapse. The bubble or bubbles cavitated during this process absorb the applied energy, for example sound energy, and then release the energy in the form of light emission during an extremely brief period of time. The intensity of the generated light depends on a variety of factors including the physical properties of the liquid (e.g., density, surface tension, vapor pressure, chemical structure, temperature, hydrostatic pressure, etc.) and the applied energy (e.g., sound wave amplitude, sound wave frequency, etc.).

Although it is generally recognized that during the collapse of a cavitating bubble extremely high temperature plasmas are developed, leading to the observed sonoluminescence effect, many aspects of the phenomena have not yet been characterized. As such, the phenomena is at the heart of a considerable amount of research as scientists attempt to not only completely characterize the phenomena (e.g., effects of pressure on the cavitating medium), but also its many applications (e.g., sonochemistry, chemical detoxification, ultrasonic cleaning, etc.).

In a typical cavitation system, for example as shown by Dan et al. in an article entitled *Ambient Pressure Effect on Single-Bubble Sonoluminescence* (vol. 83, no. 9 of Physical Review Letters), the cavitation chamber is a simple glass flask that is filled or semi-filled with cavitation fluid. A spherical flask is also disclosed in U.S. Pat. No. 5,659,173. The specification of this patent discloses using flasks of Pyrex®, Kontes®, and glass with sizes ranging from 10 milliliters to 5 liters. The drivers as well as a microphone piezoelectric were epoxied to the exterior surface of the chamber.

In some instances, more elaborate chambers are employed in the cavitation system. For example, U.S. Pat. No. 4,333,796 discloses a cavitation chamber designed for use with a liquid metal. As disclosed, the chamber is generally cylindrical and comprised of a refractory metal such as tungsten, titanium, molybdenum, rhenium or some alloy thereof. Surrounding the cavitation chamber is a housing which is purportedly used as a neutron and tritium shield. Projecting through both the outer housing and the cavitation chamber walls are a number of acoustic horns, each of the acoustic horns being coupled to a transducer which supplies the mechanical energy to the associated horn. The specification discloses that the horns, through the use of flanges, are secured to the chamber/housing walls in such a way as to provide a seal and that the transducers are mounted to the outer ends of the horns.

A tube-shaped cavitation system is disclosed in U.S. Pat. No. 5,658,534, the tube fabricated from stainless steel. Multiple ultrasonic transducers are attached to the cavitation tube, each transducer being fixed to a cylindrical half-wavelength coupler by a stud, the coupler being clamped within a stainless steel collar welded to the outside of the sonochemical tube. The collars allow circulation of oil through the collar and an external heat exchanger.

Another tube-shaped cavitation system is disclosed in U.S. Pat. No. 6,361,747. In this cavitation system the acoustic cavitation reactor is comprised of a flexible tube. The liquid to be treated circulates through the tube. Electroacoustic transducers are radially and uniformly distributed around the tube, each of the electroacoustic transducers having a prismatic bar shape. A film of lubricant is interposed between the transducer heads and the wall of the tube to help couple the acoustic energy into the tube.

U.S. Pat. No. 5,858,104 discloses a shock wave chamber partially filled with a liquid. The remaining portion of the chamber is filled with gas which can be pressurized by a connected pressure source. Acoustic transducers are used to position an object within the chamber while another transducer delivers a compressional acoustic shock wave into the liquid. A flexible membrane separating the liquid from the gas reflects the compressional shock wave as a dilation wave focused on the location of the object about which a bubble is formed.

PCT Application No. US02/16761 discloses a nuclear fusion reactor in which at least a portion of the liquid within the reactor is placed into a state of tension, this state of tension being less than the cavitation threshold of the liquid. The liquid preferably includes enriched deuterium or tritium, the inventors citing deuterated acetone as an exemplary liquid. In at least one disclosed embodiment, acoustic waves are used to pretension the liquid. In order to minimize the effects of gas cushioning during bubble implosion, the liquid is degassed prior to tensioning. A resonant cavity is formed within the chamber using upper and lower pistons, the pistons preferably fabricated from glass. The upper and lower pistons are smaller than the inside diameter of the chamber, thus allowing cavitation fluid to pass by the pistons. In a preferred embodiment, the upper piston is flexibly anchored to the chamber using wire anchors while the lower piston is rigidly anchored to the chamber.

SUMMARY OF THE INVENTION

The present invention provides a cavitation chamber separated into two volumes by a gas-tight and liquid-tight seal, the seal formed by the combination of a rigid acoustic reflector and a flexible member. The rigid reflector improves the cavitation characteristics of the chamber while the flexible member insures that the reflector can move during the cavitation process. One of the two chamber volumes is filled, or at least partially filled, with cavitation fluid while the other chamber volume remains devoid of cavitation fluid during system operation. A conduit couples a region above the liquid free surface in one cavitation volume to the second, unfilled chamber volume, thus preventing the reflector from being subjected to undue pressures which could possibly lead to its failure. An acoustic driver, such as a ring of piezoelectric material, is coupled to the chamber and used to drive cavitation within the cavitation fluid contained within the chamber.

Various methods are disclosed to flexibly couple the rigid reflector to the internal surfaces of the cavitation chamber. In one embodiment, the flexible coupling member is comprised of a flexible adhesive/sealant such as a silicon adhesive. In an alternate embodiment, the flexible coupling is fabricated from an elastomeric material such as a natural or synthetic rubber. The elastomeric material can be bonded or otherwise attached to both the rigid reflector and the internal surfaces of the cavitation chamber.

In at least one embodiment of the invention, the rigid reflector can be used in conjunction with a second reflector, the second reflector located along a liquid free surface within the chamber.

A further understanding of the nature and advantages of the present invention may be realized by reference to the remaining portions of the specification and the drawings.

DESCRIPTION OF THE SPECIFIC EMBODIMENTS

Figure 1:
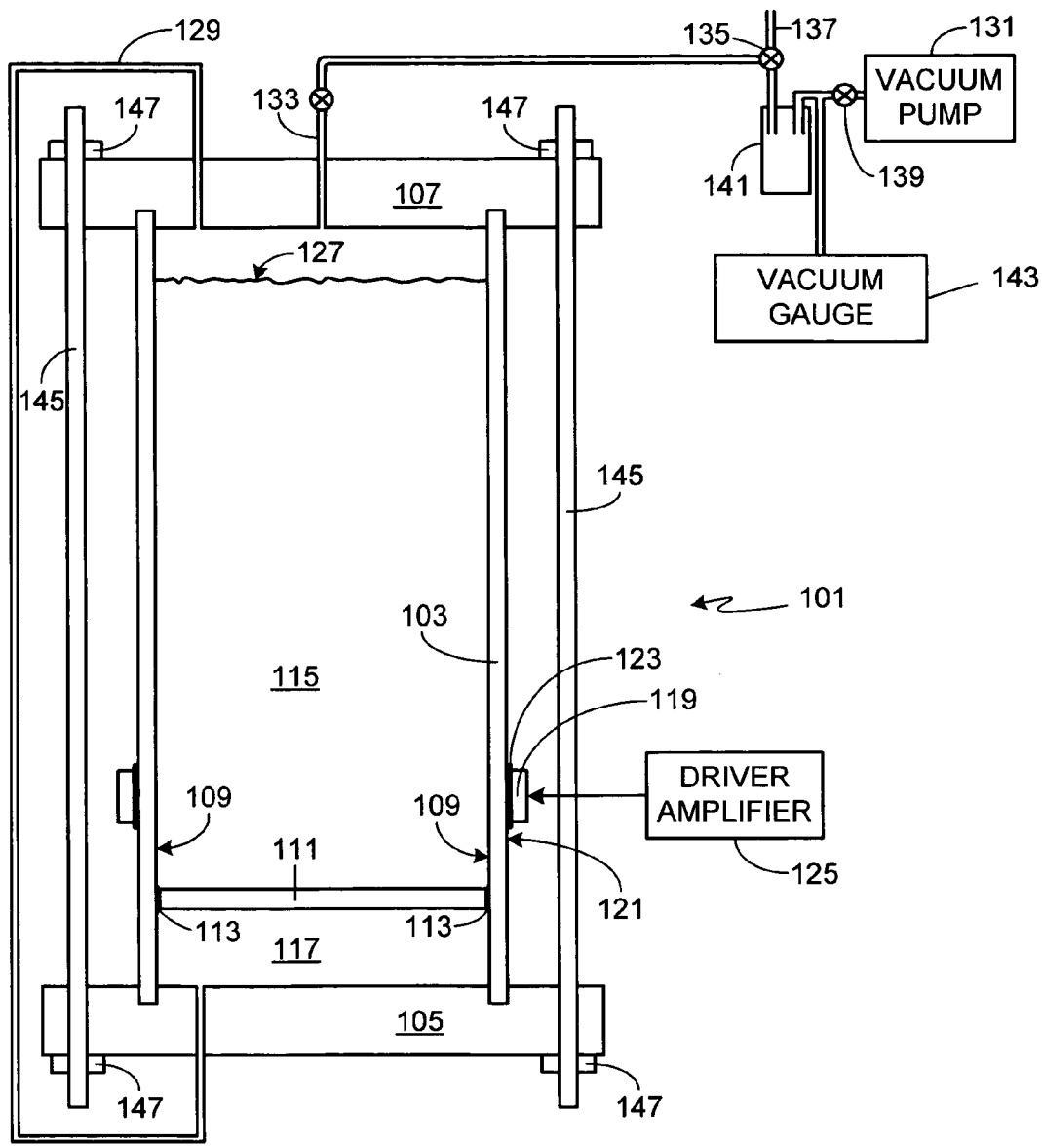
FIG. 1 is a cross-sectional view of a cavitation chamber and reflector assembly according to the invention.

FIG. 1 is an illustration of a cavitation chamber and reflector assembly according to the invention. In this embodiment, chamber 101 is comprised of a cylindrical wall portion 103 and a pair of end caps 105 and 107. Coupled to inside surface 109 of cylindrical wall portion 103 is a rigid bottom reflector 111. In this embodiment, rigid reflector 111 is preferably bonded to surface 109 of wall portion 103 at bond line 113 using a silicon adhesive and sealant. It will be appreciated that there are numerous bonding/sealing materials that can be used instead of a silicon adhesive/sealant and, more broadly, there are numerous techniques that can be used to attach reflector 111 to the inside walls of the cavitation chamber. The primary consideration placed on such a reflector mounting technique is that it is flexible, thus allowing reflector 111 to move during the cavitation process. Additionally, it must be capable of providing a leak-proof seal (i.e., both a gas-tight and a liquid-tight seal), thereby preventing cavitation fluid 115 contained within the chamber from leaking into lower chamber portion 117, chamber portion 117 being devoid of cavitation fluid.

During system operation, cavitation is driven within cavitation fluid 115 by one or more acoustic drivers. In the embodiment illustrated in FIG. 1 a single driver 119 comprised of a ring of piezoelectric material is coupled to the exterior surface 121 of cylindrical chamber portion 103. Preferably driver 119 is bonded to surface 121 along bond line 123, for example using an epoxy. As in a conventional cavitation chamber, the driver is coupled to a driver power amplifier 125.

In order to insure flexibility of reflector 111 along bond joint 113, and to prevent breakage of reflector 111 if it is fabricated from a relatively fragile material such as glass, the pressure within portion 117 of chamber 101 is kept in equilibrium with the pressure above the cavitation fluid free surface (e.g., interface 127). Preferably pressure equalization is maintained by physically coupling the two regions, for example with a conduit 129. It will be appreciated that the cavitation fluid free surface does not have to occur within chamber 101 as shown (i.e., interface 127). For example, the interface can occur within the portion of conduit 129 that passes through end cap 107. Typically the location of the cavitation fluid free surface is selected to optimize the cavitation process and thus is dependent upon a number of factors including, but not limited to, the selected cavitation fluid, the dimensions of the chamber, and the type, location, number and capabilities of the driver(s).

In order to efficiently achieve high energy density (e.g., temperature) cavitation induced implosions within the cavitation fluid within the cavitation chamber, preferably the cavitation fluid is first adequately degassed of unwanted contaminants. Without sufficient degassing, gas within the cavitation fluid will impede the cavitation process by decreasing the maximum rate of collapse as well as the peak stagnation pressure and temperature of the plasma within the cavitating bubbles. It will be understood that the term "gas", as used herein, refers to any of a variety of gases that are trapped within the cavitation fluid, these gases typically reflecting the gases contained within air (e.g., oxygen, nitrogen, argon, etc.). In contrast, "vapor" only refers to molecules of the cavitation fluid that are in the gaseous phase.

The present invention is not limited to a particular degassing technique. In the preferred embodiment, degassing is performed with a vacuum pump 131 that is coupled to chamber 101 via conduit 133. In an alternate embodiment, degassing can be performed within a separate degassing reservoir in which the cavitation fluid is degassed prior to filling the cavitation chamber. In yet another alternate embodiment, the cavitation fluid can be degassed initially outside of chamber 101 and then again within chamber 101.

In the embodiment illustrated in FIG. 1, a three-way valve 135 allows the system to be coupled to the ambient atmosphere via conduit 137 or to vacuum pump 131. It will be appreciated that three-way valve 135 can be replaced with a pair of two-way valves (not shown). Valve 139 provides a means for isolating the system from pump 131. Preferably a trap 141 is used to insure that cavitation fluid is not drawn into vacuum pump 131 or vacuum gauge 143. Preferably trap 141 is cooled so that any cavitation medium entering the trap condenses or solidifies. Vacuum gauge 143 is used to provide an accurate assessment of the system pressure. If the cavitation system becomes pressurized, prior to re-coupling the system to either vacuum gauge 143 or vacuum pump 131 the cavitation system pressure is bled down to an acceptable level using three-way valve 135.

A cavitation fluid filling system, not shown, is coupled to chamber 101 and used to fill the chamber to the desired level. It will be appreciated that the operating level for a particular cavitation chamber is based on obtaining the most efficient cavitation action. For example, while a spherical chamber may be most efficiently operated when it is completely full, a vertically aligned cylindrical chamber (e.g., the chamber shown in FIG. 1) may operate most efficiently when it is not completely full, thus providing a free cavitation liquid surface at the top of the chamber (e.g., surface 127 in FIG. 1). The filling system may utilize a simple fill tube (e.g., conduit 137), a separate fluid reservoir, or other filling means. Regardless of the method used to fill the cavitation chamber, preferably the system is evacuated prior to filling, thus causing the cavitation medium to be drawn into the system (i.e., utilizing ambient air pressure to provide the pressure to fill the system).

Although not required, the filling system may include a circulatory system, such as that described in co-pending U.S. patent application Ser. No. 11/001,720, filed Dec. 1, 2004, entitled Cavitation Fluid Circulatory System for a Cavitation Chamber, the disclosure of which is incorporated herein for any and all purposes. Other components that may or may not be coupled to the cavitation fluid filling and/or circulatory system include bubble traps, cavitation fluid filters, and heat exchange systems. Further descriptions of some of these variations are provided in co-pending U.S. patent application Ser. No. 10/961,353, filed Oct. 7, 2004, entitled Heat Exchange System for a Cavitation Chamber, the disclosure of which is incorporated herein for any and all purposes.

Although the chamber shown in the embodiment of FIG. 1 is a cylindrical chamber, it should be appreciated that the invention is not limited to a particular configuration. Particular configurations are typically selected to accommodate a specific cavitation process and its corresponding process parameters (e.g., cavitation fluid, pressure, temperature, reactants, etc.). Examples of other configurations include spherical chambers, hourglass-shaped chambers, conical chambers, cubical chambers, rectangular chambers, irregularly-shaped chambers, etc. One method of fabricating a suitable spherical chamber is described in detail in co-pending U.S. patent application Ser. No. 10/925,070, filed Aug. 23, 2004, entitled Method of Fabricating a Spherical Cavitation Chamber, the entire disclosure of which is incorporated herein for any and all purposes. Examples of hourglass-shaped chambers are provided in co-pending U.S. patent application Ser. No. 11/140,175, filed May 27, 2005, entitled Hourglass-Shaped Cavitation Chamber, and Ser. No. 11/149,791, filed Jun. 9, 2005, entitled Hourglass-Shaped Cavitation Chamber with Spherical Lobes, the entire disclosures of which are incorporated herein for any and all purposes.

The cavitation chamber of the invention can be fabricated from any of a variety of materials, or any combination of materials. The primary considerations for material selection are the desired operating pressure and temperature of the chamber and system. Additionally, the chamber materials can be selected to simplify viewing of the sonoluminescence phenomena, for example utilizing a transparent material such as glass, borosilicate glass (e.g., Pyrex®), or quartz glass. Alternately the cavitation chamber can be fabricated from a more robust material (e.g., 17-4 precipitation hardened stainless steel) and one which is preferably machinable, thus simplifying fabrication. Alternately a portion of the chamber can be fabricated from one material while other portions of the chamber can be fabricated from one or more different materials. For example, in the preferred embodiment illustrated in FIG. 1, cylindrical portion 103 is fabricated from a transparent material (e.g., glass) while end caps 105 and 107 are fabricated from a metal (e.g., aluminum), the assembly being held together with multiple all-threads 145 and nuts 147. In addition to the above considerations, preferably the material or materials selected for the cavitation chamber are relatively corrosion resistant to the intended cavitation fluid, thus allowing the chamber to be used repeatedly.

Although reflector 111 can be fabricated from any of a variety of materials, preferably the selected material is rigid and relatively light weight. Additionally, reflector 111 must be capable of withstanding the pressure waves created by the cavitating bubbles within cavitation fluid 115. The inventor has found that reflector 111 can either be hollow (e.g., a hollow disc) or solid. For example, in one embodiment reflector 111 is comprised of a hollow glass disc. In an alternate embodiment, reflector 111 is comprised of a solid glass disc. In yet another alternate embodiment, reflector 111 is comprised of a hollow metal disc, preferably a titanium hollow disc. In yet another alternate embodiment, reflector 111 is comprised of a solid metal disc, preferably a titanium disc. It will be appreciated that glass and titanium are exemplary materials and that the invention is not limited to these materials. Additionally, it should be understood that the shape of the reflector is driven by the shape of the cavitation chamber, thus reflector 111 is disc-shaped only because chamber 101 is cylindrically-shaped.

Although in the preferred embodiment shown in FIG. 1 the reflector is bonded to the inside surface of the chamber using a flexible bonding material such as a silicon adhesive and sealant, the invention is not limited to this particular configuration. For example, the embodiment shown in FIG. 2 uses a neoprene material 201 attached to a reflector 203, the neoprene material allowing reflector movement while providing the necessary seal between cavitation fluid 115 and chamber portion 117. In the illustrated embodiment, the inside edge 205 of neoprene flexible seal 201 is bonded to reflector 203 along a bond joint, the bond joint preferably located within a groove in the reflector. Similarly the outside edge 207 of neoprene flexible seal 201 is bonded to the walls 103 of the cavitation chamber along a second bond joint, the second bond joint preferably located within a groove in the cavitation chamber walls. The bond joint can be comprised of any bonding agent (i.e., epoxy, silicon adhesive, etc.) that is capable of bonding to the materials in question (e.g., neoprene, reflector material, chamber wall material) and providing a gas-tight and liquid-tight seal. This bond does not have to be flexible, however, as the required flexibility is provided by neoprene seal 201.

Figure 2:
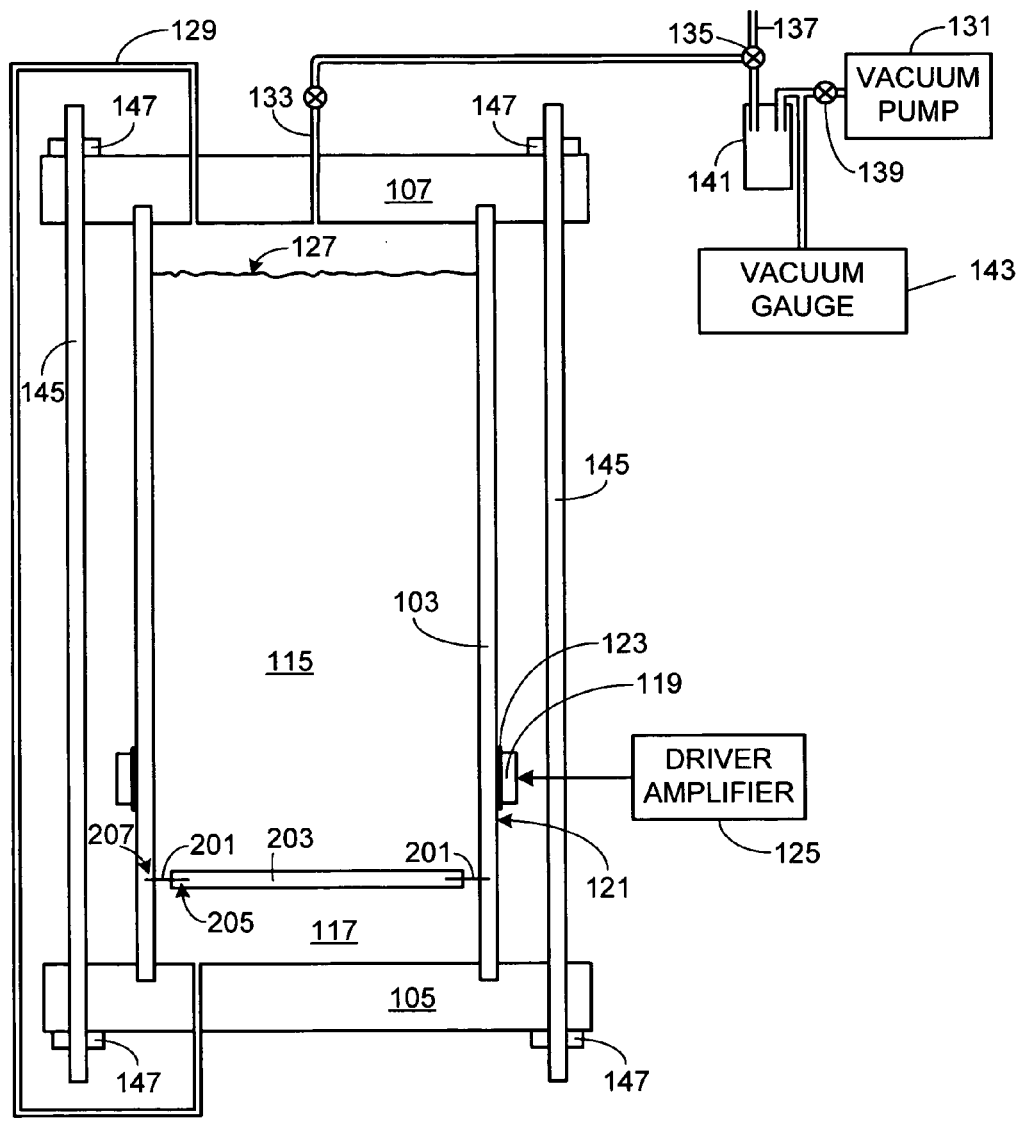
FIG. 2 is a cross-sectional view of a cavitation chamber and reflector assembly similar to that shown in FIG. 1, utilizing a different reflector seal.
Figure 3:
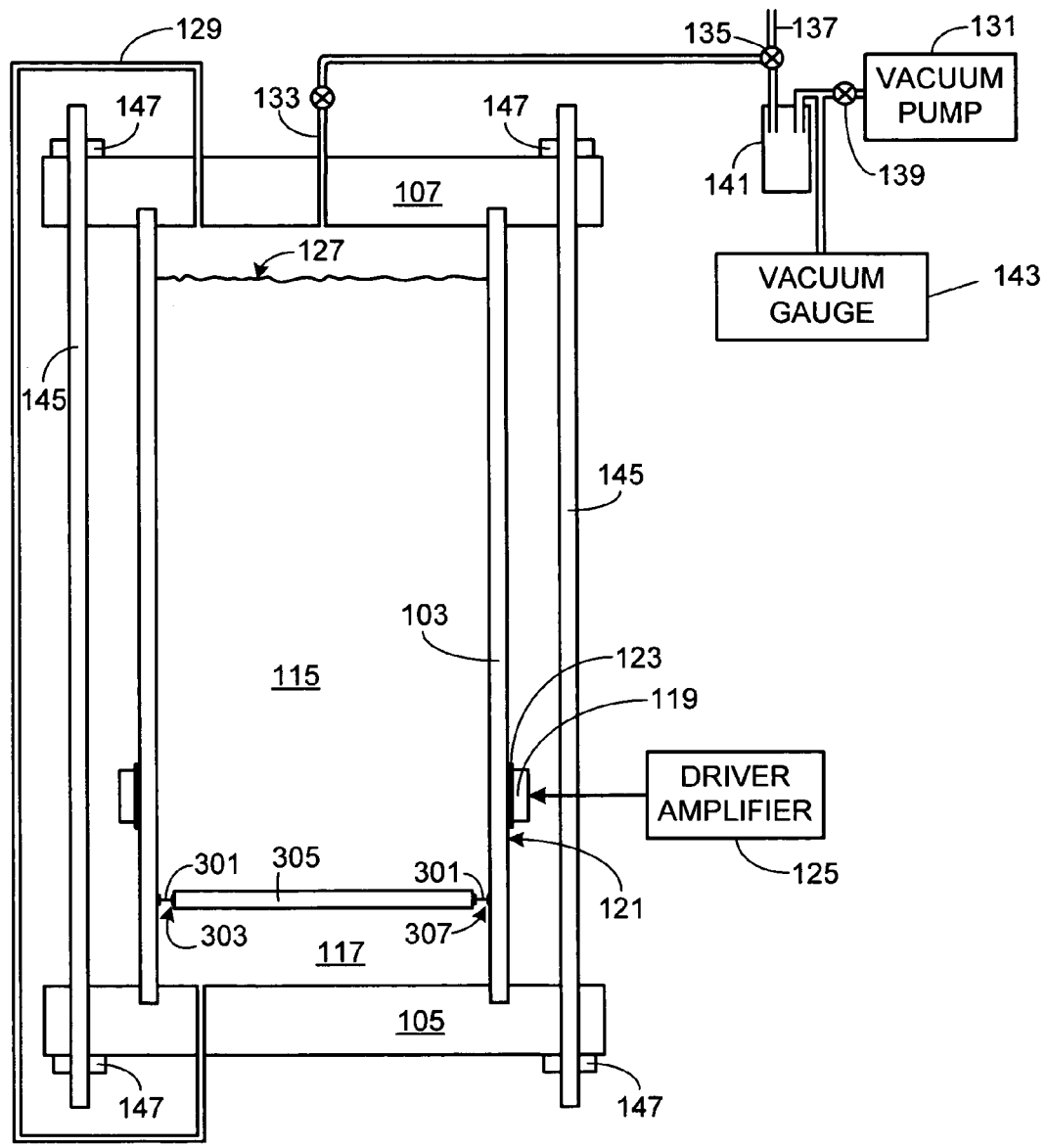
FIG. 3 is a cross-sectional view of a cavitation chamber and reflector assembly similar to that shown in FIG. 1, utilizing a different reflector seal.

The embodiment illustrated in FIG. 3 is similar to that shown in FIG. 2, except that flexible neoprene seal 301 includes a flange 303 along its inside surface, thus allowing it to be bonded to the outside circumference of reflector 305. Similarly, seal 301 includes a flange 307 along its outside surface, flange 307 providing a suitable bonding surface in order to bond the flexible seal to the inside surface of chamber walls 103.

Figure 4:
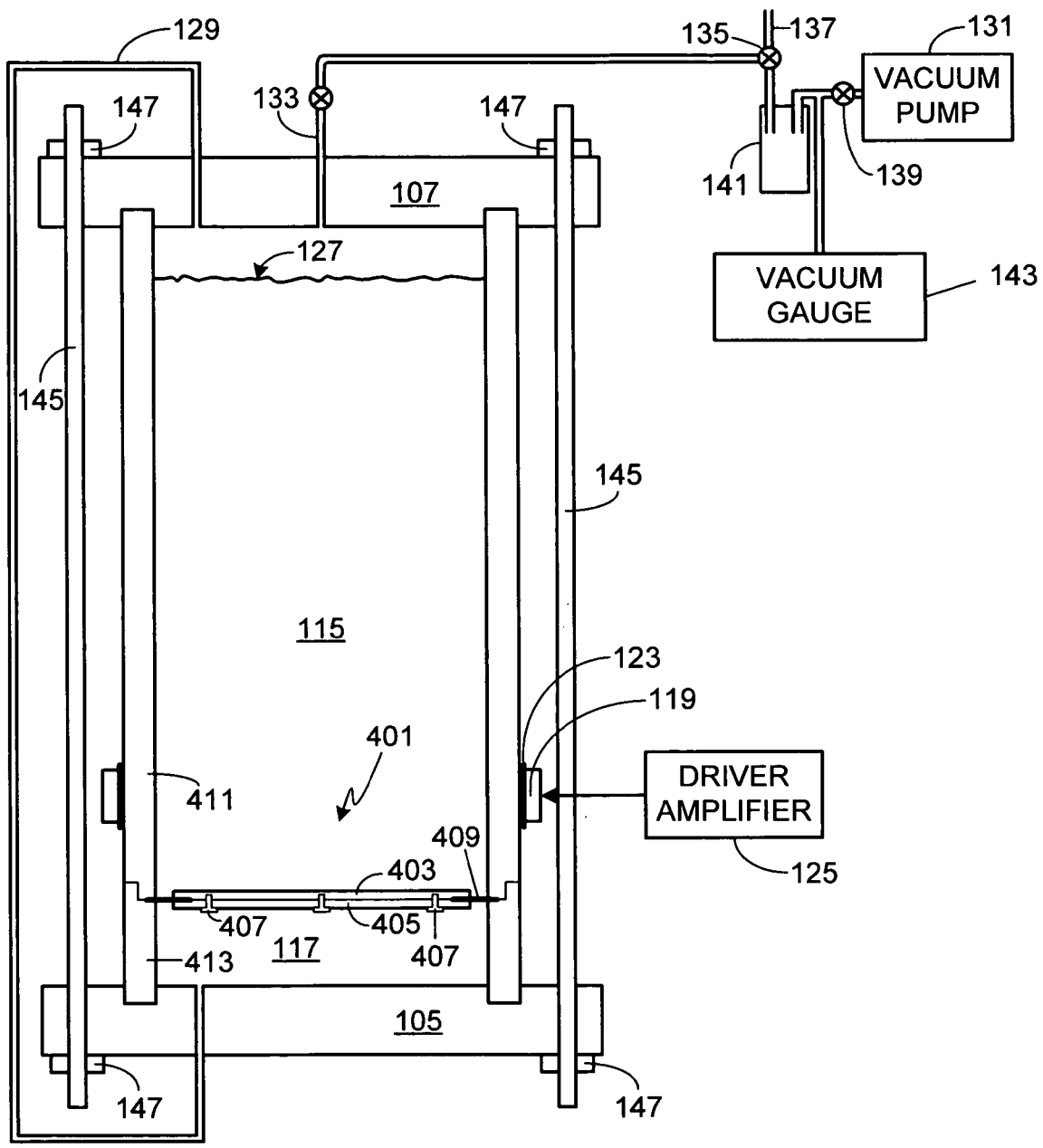
FIG. 4 is a cross-sectional view of a cavitation chamber and reflector assembly similar to that shown in FIG. 1, utilizing a different reflector seal.

In the embodiment illustrated in FIG. 4, rigid reflector 401 is comprised of an upper reflector member 403 and a lower reflector member 405 held together with multiple threaded means 407 (e.g., screws, bolts, etc.). Captured in between the reflector members 403 and 405 is the inner edge of neoprene flexible seal 409. The outer edge of neoprene flexible seal 409 is captured between first chamber wall member 411 and second chamber wall member 413. It will be appreciated that there are numerous methods of designing the mating surfaces of wall members 411 and 413 that provide both a strong wall and a means of capturing the edge of seal 409. The inner and outer portions of seal 409 are sealed with a suitable sealant (e.g., silicon adhesive) to reflector members 403/405 and wall members 411/413, respectively, to insure a gas-tight and liquid-tight seal.

In the embodiments illustrated in FIGS. 2-4 seals 201, 301 and 409 are fabricated from neoprene. It should be appreciated, however, that these seals can be fabricated from any of a variety of elastomeric materials, including both natural and synthetic rubbers. In addition to the need for flexibility, the elastomeric material selected for the seal must be corrosion resistant to the intended cavitation fluid and provide both a gas-tight and liquid-tight seal. Preferably the selected material is also readily bondable, thus providing a simple method of bonding the seal to both the reflector and the chamber wall.

Figure 5:
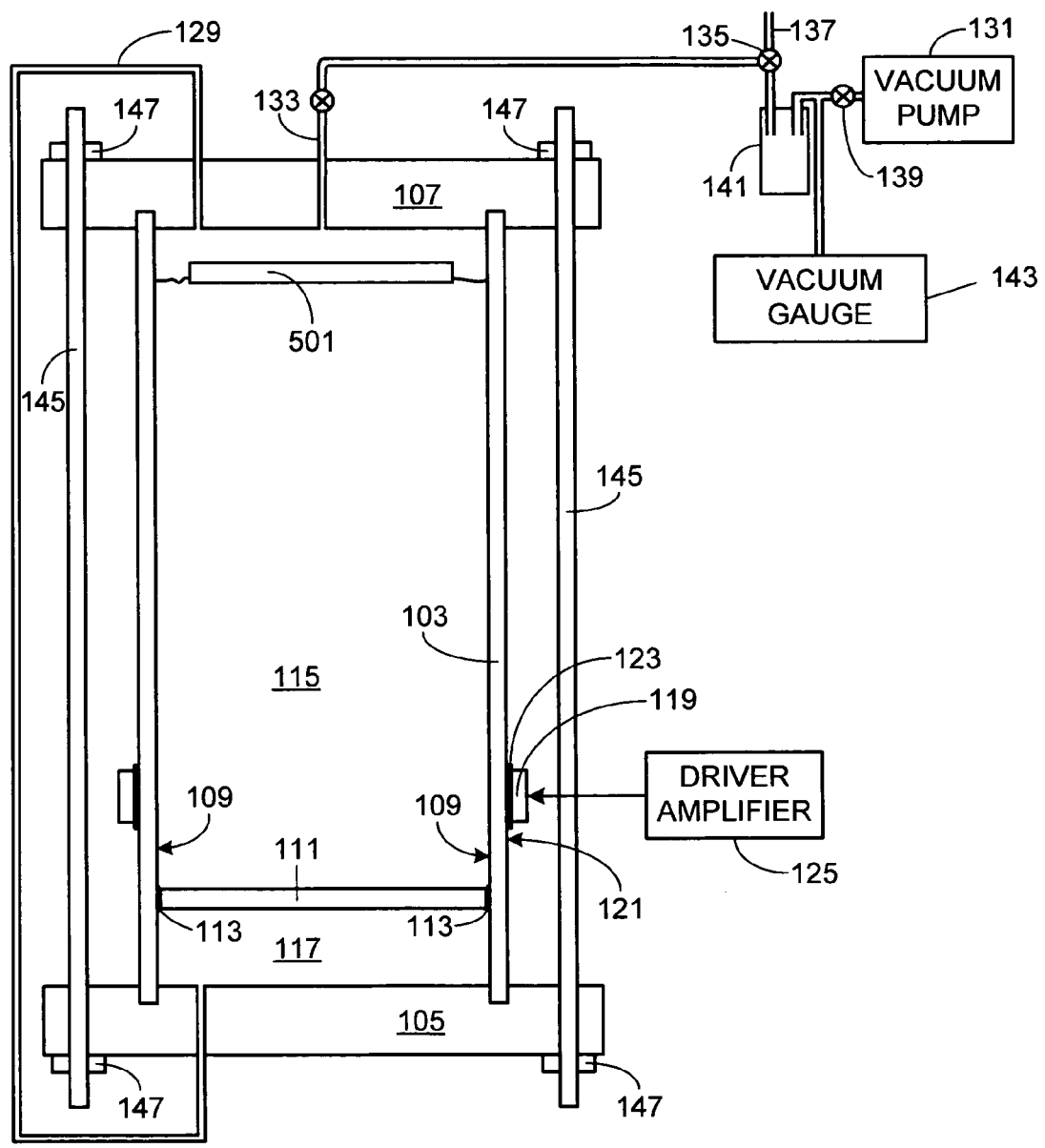
FIG. 5 is a cross-sectional view of a cavitation chamber and reflector assembly similar to that shown in FIG. 1, further including an upper reflector.
Figure 6:
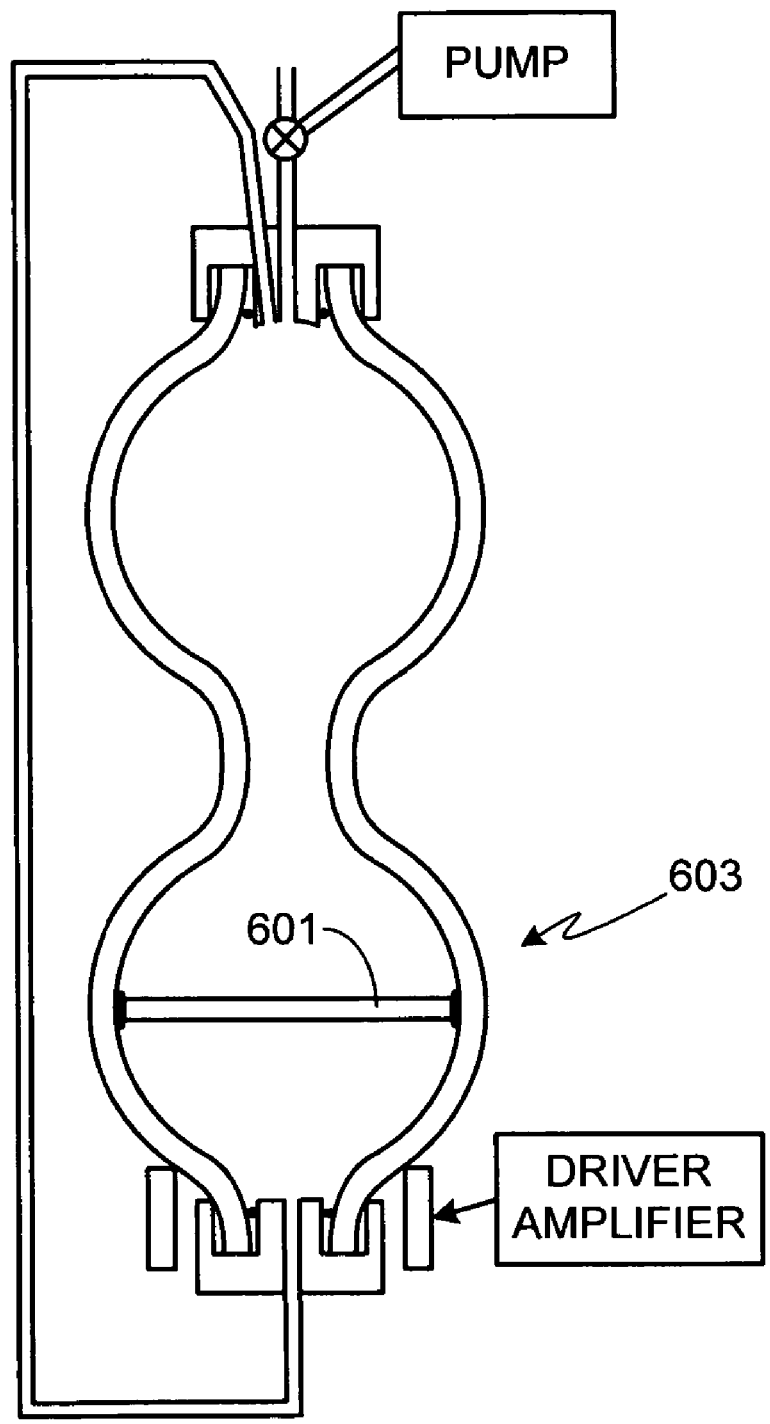
FIG. 6 is a cross-sectional view of a reflector assembly similar to that shown in FIG. 1 with a dual spherical lobe chamber.
Figure 7:
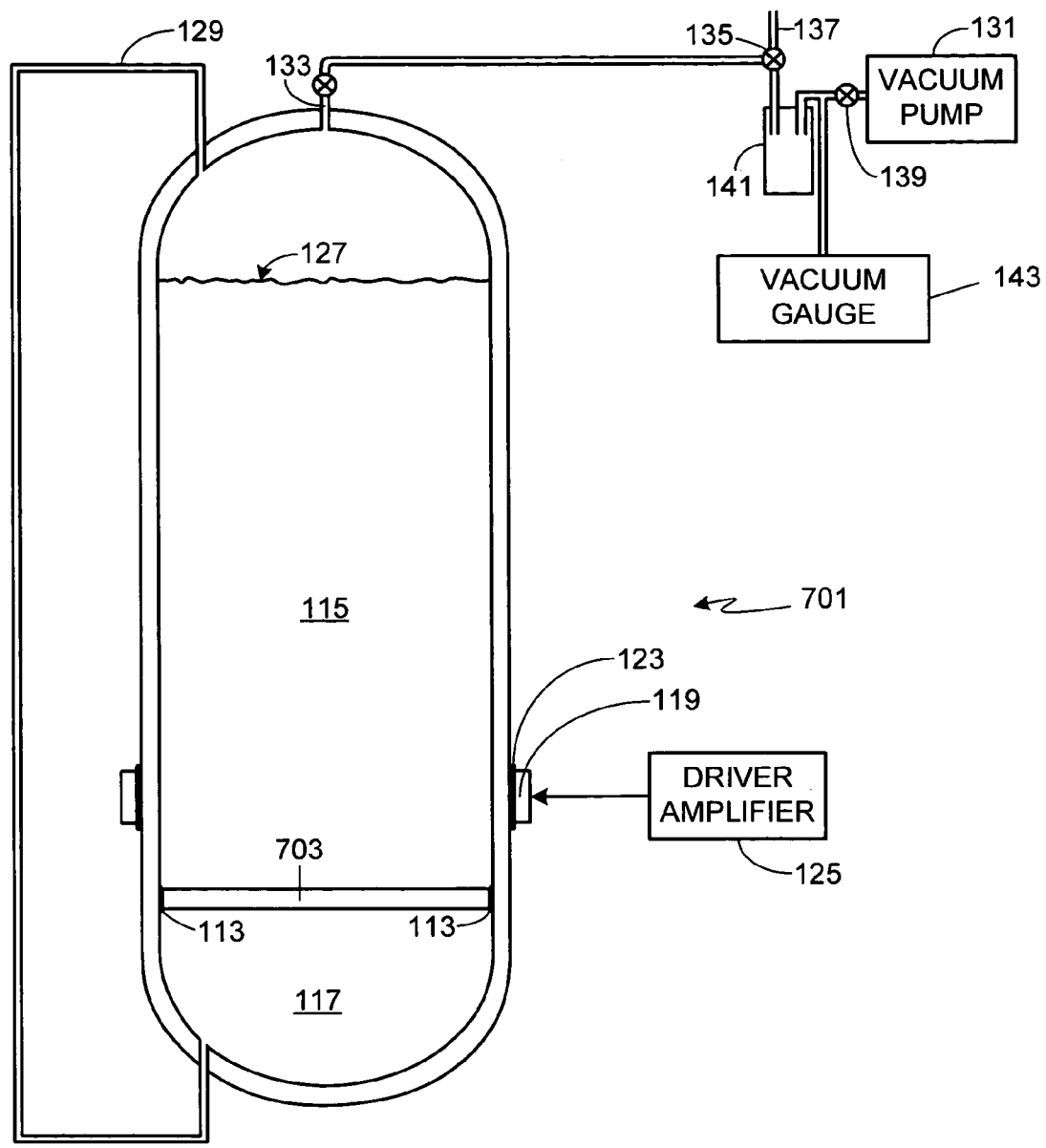
FIG. 7 is a cross-sectional view of a reflector assembly similar to that shown in FIG. 1 with an all-glass cavitation chamber.

As previously noted, the use of a reflector as described herein is not limited to the illustrated embodiments. For example, the reflector can be used in conjunction with an upper reflector 501 in order to create a resonant cavity within a cavitation chamber (see, for example, the embodiment illustrated in FIG. 5, based on the configuration shown in FIG. 1). Also, as previously noted, the reflector can be used in a non-cylindrical cavitation chamber. For example, the embodiment illustrated in FIG. 6 includes a pair of spherical lobes. A reflector 601, similar to that shown in FIG. 1, is included within bottom chamber lobe 603. Additionally, a bottom reflector in accordance with the invention can also be used with other chamber designs, for example an all-glass chamber 701 with a bottom reflector 703 as shown in FIG. 7. It will be appreciated that other style chambers such as those shown in FIGS. 6 and 7 can also utilize reflector sealing arrangements as disclosed relative to the embodiments shown in FIGS. 2-4, and can also include an upper reflector as disclosed relative to the embodiment shown in FIG. 5.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A cavitation system, comprising:
   a cavitation chamber partially filled with a cavitation fluid;
   means for forming a gas-tight and liquid-tight separation between a first chamber volume and a second chamber volume within said cavitation chamber, wherein said first chamber volume is devoid of said cavitation fluid, wherein said cavitation fluid is contained within said second chamber volume, and wherein said separation forming means further comprises a rigid reflector and a flexible member coupling the rigid reflector to an inside surface of said cavitation chamber;
   a conduit coupling said first chamber volume with a region within said second chamber volume, wherein said region is located above a liquid free surface within said second chamber volume; and
   an acoustic driver coupled to said cavitation chamber.

2. The cavitation system of claim 1, wherein said flexible member is comprised of an adhesive sealant.

3. The cavitation system of claim 2, wherein said adhesive sealant is a silicon adhesive sealant.

4. The cavitation system of claim 1, wherein said flexible member is comprised of an elastomeric member.

5. The cavitation system of claim 4, wherein said flexible member further comprises a first bond joint between said elastomeric member and said rigid reflector and a second bond joint between said elastomeric member and said inside surface of said cavitation chamber.

6. The cavitation system of claim 1, wherein said region is located within said conduit.

7. The cavitation system of claim 1, further comprising a second rigid reflector, wherein said second rigid reflector is located along said liquid free surface.

8. The cavitation system of claim 1, wherein said acoustic driver further comprises a ring-shaped piezoelectric transducer coupled to an exterior surface of said cavitation chamber.

9. The cavitation system of claim 1, wherein said rigid reflector further comprises a first reflector member and a second reflector member, and wherein a portion of said flexible member is captured between said first and second reflector members.

10. The cavitation system of claim 1, wherein said cavitation chamber is a cylindrically-shaped chamber.

11. The cavitation system of claim 1, wherein said rigid reflector is hollow.

12. The cavitation system of claim 1, wherein said rigid reflector is comprised of a glass material.

13. The cavitation system of claim 1, wherein said rigid reflector is comprised of a metal.

* * * * *